US010018205B2

(12) United States Patent
Pinkney et al.

(10) Patent No.: US 10,018,205 B2
(45) Date of Patent: Jul. 10, 2018

(54) IMPELLER SHAFT (71) Applicant: NAPIER TURBOCHARGERS LIMITED, Lincoln, Lincolnshire (GB)

(72) Inventors: Ian Pinkney, Market Rasen (GB); Ian Patrick Clare Brown, Nottingham (GB); Matthew Elijah Moore, Lincoln (GB); Stuart Michael Potter, Burton-upon-Stather (GB); Francis Joseph Geoffrey Heyes, Lincoln (GB)

(73) Assignee: NAPIER TURBOCHARGERS LIMITED, Lincoln, Lincolnshire (GB)

( * ) Notice: Subject to any disclaimer, the term of this patent is extended or adjusted under 35 U.S.C. 154(b) by 310 days.

(21) Appl. No.: 14/435,376

(22) PCT Filed: Nov. 26, 2013

(86) PCT No.: PCT/GB2013/053117
§ 371 (c)(1),
(2) Date: Apr. 13, 2015

(87) PCT Pub. No.: WO2014/083325
PCT Pub. Date: Jun. 5, 2014

(65) Prior Publication Data
US 2015/0275921 A1 Oct. 1, 2015

(30) Foreign Application Priority Data
Nov. 28, 2012 (GB) .................................. 1221429.2

(51) Int. Cl.
F04D 29/60 (2006.01)
F04D 19/00 (2006.01)
(Continued)

(52) U.S. Cl.
CPC .......... *F04D 29/602* (2013.01); *F01D 5/025* (2013.01); *F01D 5/048* (2013.01); *F04D 19/00* (2013.01);
(Continued)

(58) Field of Classification Search
CPC .......... F01D 5/025; F01D 5/026; F01D 5/048; F04D 29/266; F04D 29/284
See application file for complete search history.

(56) References Cited

U.S. PATENT DOCUMENTS 2,577,134 A   12/1951 Land
4,340,317 A   7/1982 Heitmann et al.
(Continued)

FOREIGN PATENT DOCUMENTS

CN   102444613 A   5/2012
DE   29702119 U1   4/1997
(Continued)

*Primary Examiner* — Woody Lee, Jr.
*Assistant Examiner* — Brian O Peters
(74) *Attorney, Agent, or Firm* — Egbert Law Offices, PLLC (57) ABSTRACT A connected impeller and shaft is provided. The shaft has a first part which provides a threaded portion carrying a thread which screws onto a corresponding threaded portion of the impeller. The shaft also has a second part which provides an abutment surface for engaging a corresponding abutment surface of the impeller when the threaded portions are screwed together, thereby tightening the threads to provide a rotationally fixed connection between the impeller and the shaft. The first part is rotationally fixed relative to the second part at a joint. The threaded portion of the shaft is axially spaced a first distance from the abutment surface of the shaft. The threaded portion of the shaft is axially spaced from the joint by a second distance which is greater than the first distance. The threaded portion of the shaft and the joint are on the same side of the impeller.

4 Claims, 5 Drawing Sheets (51) Int. Cl.
    *F04D 29/26*     (2006.01)
    *F01D 5/02*     (2006.01)
    *F16D 1/076*     (2006.01)
    *F01D 5/04*     (2006.01)
    *F16D 1/06*     (2006.01)

(52) U.S. Cl.
    CPC ........... *F04D 29/266* (2013.01); *F16D 1/076* (2013.01); *F05D 2220/40* (2013.01); *F05D 2230/642* (2013.01); *F16D 2001/062* (2013.01)

(56) References Cited

U.S. PATENT DOCUMENTS

| | | |
|---|---|---|
| 4,810,918 A | 3/1989 | Kachuk |
| 8,425,189 B2 * | 4/2013 | Jaeger ..................... F04D 29/20 415/216.1 |
| 2004/0202556 A1 * | 10/2004 | Svihla ..................... F01D 5/026 417/407 |
| 2005/0232775 A1 | 10/2005 | Thiele et al. |
| 2013/0330193 A1 | 12/2013 | Asano et al. |

FOREIGN PATENT DOCUMENTS

| | | | |
|---|---|---|---|
| DE | 102010020213 A1 | | 11/2011 |
| EP | 1130220 A2 | | 9/2001 |
| EP | 1273757 A1 | | 1/2003 |
| EP | 1394387 A2 | | 3/2004 |
| GB | 604730 A | | 7/1948 |
| GB | 798480 A | | 7/1958 |
| GB | 866710 A | | 4/1961 |
| JP | S57 11298 U | | 1/1982 |
| JP | H03122203 U | | 12/1991 |
| WO | 2012115086 A1 | | 8/2012 |
| WO | WO 2013138143 | * | 3/2013 |
| WO | WO2013093424 | * | 6/2013 |

* cited by examiner

IMPELLER SHAFT

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

The present invention relates to a shaft for connecting to an impeller.

2. Description of Related Art Including Information Disclosed Under 37 CFR 1.97 and 37 CFR 1.98.

Turbocharger impellers are typically made of aluminium alloys to provide low rotational inertia with reasonable strength at a commercially-acceptable cost. Attachment of the impeller to the steel turbocharger shaft is achieved in various ways. For example, because of the relative weakness of aluminium and the small diameter of the shaft, one option is to provide the impeller with a steel insert containing a screw-threaded socket which can be threaded on to the shaft. This arrangement can take a higher torque than a connection in which the shaft is directly threaded into the aluminium body (the torque is proportional to the power transmitted across the joint, and so the impeller can be used at a higher pressure ratio than one in which there is a direct threaded connection).

Typically, such an insert is fitted into the impeller by shrink fitting; the aluminium body of the impeller is heated to expand the bore which is to receive the steel insert, while the insert is cooled, for example using liquid nitrogen, before being inserted into the bore. The resultant interference connection is restricted by the temperature to which the aluminium can be heated before its material properties are affected, and by the temperature to which the steel can be cooled.

EP1394387 describes an insert of this type, and further proposes an outer steel constraining ring which reinforces the frictional contact between aluminium impeller and the insert. Since the ring does not expand as much as the impeller body as the turbocharger heats up, the point of grip between the impeller and the insert remains within the axial extent of the ring during the whole operating cycle of the turbocharger, thereby preventing a tendency of the impeller to "walk" along the insert. As a consequence, the operating life of the turbocharger can be considerably extended in comparison with the conventional turbocharger without the constraining ring.

When a shaft is threadingly connected to an impeller (e.g. via an insert as discussed above), the threads on the shaft and the impeller may be self-tightening to provide a rotationally fixed connection between the impeller and the shaft.

Another option is for the impeller and the shaft to have corresponding abutment surfaces which engage when the impeller is screwed on to the shaft, thereby tightening the threads to provide the rotationally fixed connection. In such an arrangement the threaded portion of the shaft is typically axially spaced from the abutment surface of the shaft. Differential thermal expansion effects operating between the impeller and the shaft may then cause a differential thermal strain to be set up between the shaft's threaded portion and abutment surface. This strain can produce an undesirable level of stress in the threads of the shaft and impeller.

BRIEF SUMMARY OF THE INVENTION

Accordingly, in a first aspect, the present invention provides a shaft for connecting to an impeller, wherein the shaft has a first part which provides a threaded portion carrying a thread which screws onto a corresponding threaded portion of the impeller, and a second part which provides an abutment surface (e.g. provided by a shoulder of the shaft) for engaging a corresponding abutment surface of the impeller when the threaded portions are screwed together thereby tightening the threads to provide a rotationally fixed connection between the impeller and the shaft, the first part being rotationally fixed relative to the second part at a joint, the threaded portion of the shaft being axially spaced a first distance from the abutment surface of the shaft, and the threaded portion of the shaft being axially spaced from the joint by a second distance which is greater than the first distance.

In this way, any differential thermal strain produced by differential thermal expansion effects operating between the impeller and the shaft can be accommodated over a longer distance of the shaft (i.e. over the second distance) than would otherwise be the case. The stress in the threads of the shaft's and the impeller's threaded portions can thereby be reduced.

Optional features of the first aspect of the invention will now be set out. These are applicable singly or, to the extent they are compatible, in any combination.

The shaft may be configured such that, when connected to the impeller, the threaded portion of the shaft and the joint are on the same side of the impeller.

The first part of the shaft may be an elongate member, such as a stud or tie bolt, which is located in and projects from a central cavity formed in the second part of the shaft. The threaded portion of the shaft can be provided at a projecting end of the elongate member, and the joint can be at the opposite end of the elongate member, for example within the cavity.

Another option, however, is for the second part of the shaft to be a sleeve carried on the first part of the shaft. The abutment surface of the shaft can be at one end of the sleeve (e.g. proximal to the threaded portion of the shaft) and the joint can be at the other end of the sleeve (e.g. distal from the threaded portion of the shaft).

The joint can be any suitable connection that rotationally fixes the first part relative to the second part, such as a threaded connection, a splined connection, or other type of locking connection. Indeed, it is possible for the first and second parts to be formed as a unitary body, but generally it is more convenient to form the two parts as separate bodies which are then rotationally fixed at the joint.

A second aspect of the present invention provides an impeller connected to a shaft according to the first aspect, the impeller having the corresponding threaded portion and the corresponding abutment surface.

Optional features of the second aspect of the invention will now be set out. These are applicable singly or, to the extent they are compatible, in any combination.

The shaft may be threadingly connected directly to the impeller. However, more typically, the impeller has a connector which provides the corresponding threaded portion and the corresponding abutment surface, the connector being rotationally fixed relative to the impeller. That is, the connector may be formed as a separate body, i.e. non-unitary with the rest of the impeller, which is then rotationally fixed relative to the rest of the impeller. However, the connector itself can be formed as a unitary body. A flange portion of the connector can conveniently provide the corresponding abutment surface. The threads carried by the threaded portion of the connector may be protected by a helicoil formation fitted to the connector. As the material of the connector may be less strong than the material of the shaft, the helicoil formation can thereby prevent damage to the threads of the connector. The connector may be formed with or may carry a circumferential oil thrower formation at a radially outer surface thereof.

The impeller may have a shaft-side hub extension (e.g. with a central recess, which can be in the form of a blind hole) at which the threaded portion of the first part of the shaft can screw onto the corresponding threaded portion of the impeller. A surface of the aforementioned connector may frictionally connect with a surface of the hub extension. The frictional connection between the surface of the connector and the surface of the hub extension can transmit, in use, substantially all of the torque between the shaft and the impeller Thus, for example, the impeller may have a shaft-side hub extension, and an inwardly facing surface of the connector may frictionally connect (e.g. by press fitting or shrink fitting) with a radially outer surface of the hub extension. The frictional connection between the inwardly facing surface of the connector and the radially outer surface of the hub extension can transmit, in use, substantially all of the torque between the shaft and the impeller. The inwardly facing surface of the connector may be approximately cylindrically shaped. The radially outer surface of the shaft-side hub extension of the impeller which frictionally connects with the inwardly facing surface may be correspondingly approximately cylindrical. The shaft-side hub extension may have a central recess, and the connector may be inserted into the recess. In this way, the threaded portion of the connector can be located within the central recess, enabling an axially compact arrangement. The central recess may be a blind hole (i.e. with an end surface).

Another option, however, is for the impeller to have a shaft-side hub extension with a central recess (e.g. a blind hole), and for the connector to be inserted into the recess, an outwardly facing surface of the connector frictionally connecting (e.g. by press fitting or shrink fitting) with a radially inner surface of the hub extension. The frictional connection between the outwardly facing surface of the connector and the radially inner surface of the hub extension can transmit, in use, substantially all of the torque between the shaft and the impeller. The outwardly facing surface of the connector may be approximately cylindrically shaped. The radially inner surface of the shaft-side hub extension of the impeller which frictionally connects with the outwardly facing surface may be correspondingly approximately cylindrical.

According to this option, the impeller may be formed of a material having a greater coefficient of thermal expansion than the material of the shaft, and the connector may be formed of a material having a coefficient of thermal expansion which is greater than the coefficient of thermal expansion of the material of the shaft. By forming the connector from a material having such a coefficient of thermal expansion, the differential thermal forces which encourage the impeller to "walk" can be reduced, thereby reducing any tendency of the impeller to "walk" while maintaining the torque capacity of the joint. As the connector material has a higher coefficient of thermal expansion than that of a conventional connector formed of the same material as the shaft, shrink fitting in particular can be used to produce a tighter interference with the impeller, while maintaining the temperatures to which the connector is cooled and the impeller is heated during fitting. Also, the accommodation of differential thermal strain between the shaft's threaded portion and abutment surface over the second distance can be particularly beneficial, as the problem of excessive stress in the threads of the shaft and the connector might be acute if the strain were only accommodated over the first distance. When the first part and the second part of the shaft are separate bodies which are rotationally fixed at the joint, and when the two parts of formed of different materials (although typically they might be formed of the same material), the coefficient of thermal expansion of the material of the shaft may be taken as an averaged coefficient of thermal expansion of the materials of the two parts.

When the connector is formed of a material having a coefficient of thermal expansion which is greater than the coefficient of thermal expansion of the material of the shaft, the connector may be formed of a material having a greater strength than the material of the impeller, and/or the connector may be formed of a material having a lower coefficient of thermal expansion than the material of the impeller. For example, the two parts of the shaft can be formed of steel (e.g. a high strength steel), which typically has a coefficient of thermal expansion of about $11 \times 10^{-6}$/K, and the impeller can be formed of aluminium alloy, which typically has a coefficient of thermal expansion of about $22.7 \times 10^{-6}$/K. Preferably the connector is formed of a material that is resistant to galling with the shaft. The connector can be formed, for example, of magnesium alloy, bronze, brass or stainless steel. Generally, a value for the coefficient of thermal expansion of the connector that is equal to or close to that of the impeller is preferred for reducing the differential thermal forces which encourage the impeller to "walk". Therefore, preferably the value of $(\alpha_c-\alpha_s)/(\alpha_i-\alpha_s)$ is greater than 0.2, and more preferably greater than 0.3 or 0.4, where, $\alpha_c$ is the coefficient of thermal expansion of the connector, $\alpha_i$ is the coefficient of thermal expansion of the impeller, and $\alpha_s$ is the coefficient of thermal expansion of the shaft. However, notwithstanding the two-part form of the shaft, a risk of a coefficient of thermal expansion of the connector which is much greater than that of the shaft is that the resultant stretching of the shaft at high temperatures could lead to shaft breakage. Therefore, at least for typical materials for the impeller and shaft (such as aluminium alloy and steel respectively), preferably the value of $(\alpha_c-\alpha_s)/(\alpha_i-\alpha_s)$ is less than 0.9, and more preferably less than 0.8 or 0.7. However, this does not exclude that the value of $(\alpha_c-\alpha_s)/(\alpha_i-\alpha_s)$ can be equal to or greater than 1. In particular, if the value of $(\alpha_i-\alpha_s)$ is reduced, then higher values of $(\alpha_c-\alpha_s)/(\alpha_i-\alpha_s)$ can be adopted without risk of shaft breakage. Thus one option is to form the impeller of a material having a relatively low coefficient of thermal expansion, such as silicon carbide reinforced aluminium alloy which, depending on the volume of silicon carbide, typically has a coefficient of thermal expansion in the range of from 14 to $17\times10^{-6}$/K. In such cases, a relatively high coefficient of thermal expansion for the connector not only can reduce any tendency of the impeller to "walk", but also can assist with the production of a shrink fitted frictional connection between the connector and the hub extension.

The impeller may have one or more centring portions (which may be provided by the impeller directly, and/or by the connector) having respective engagement surfaces which engage with one or more corresponding centring portions of the shaft, the threaded portion of the shaft and the centring portions of the shaft being distributed along the shaft axis.

Generally the impeller has a casing, and the connector and/or the hub extension can then form a seal with a section of the casing. For example, the seal can include a sealing ring, which may be carried by the casing section and which may be received by a corresponding circumferential recess formed on an outer surface of the connector and/or the hub extension. The sealing ring may have one or more annular grooves on its radially inner face, and the recess may have corresponding circumferential ribs which are received in the grooves. Another option is for the seal to include a labyrinth seal, with formations on facing surfaces of the casing section and the connector and/or the hub extension forming the labyrinth.

A third aspect of the present invention provides a turbocharger having the connected impeller and shaft of the second aspect. Thus the impeller may be at one end of the shaft and an exhaust gas turbine may be joined to an opposite end of the shaft.

Further optional features of the invention are set out below.

BRIEF DESCRIPTION OF THE DRAWINGS

Embodiments of the invention will now be described by way of example with reference to the accompanying drawings in which.

DETAILED DESCRIPTION OF THE INVENTION

Figure 1:
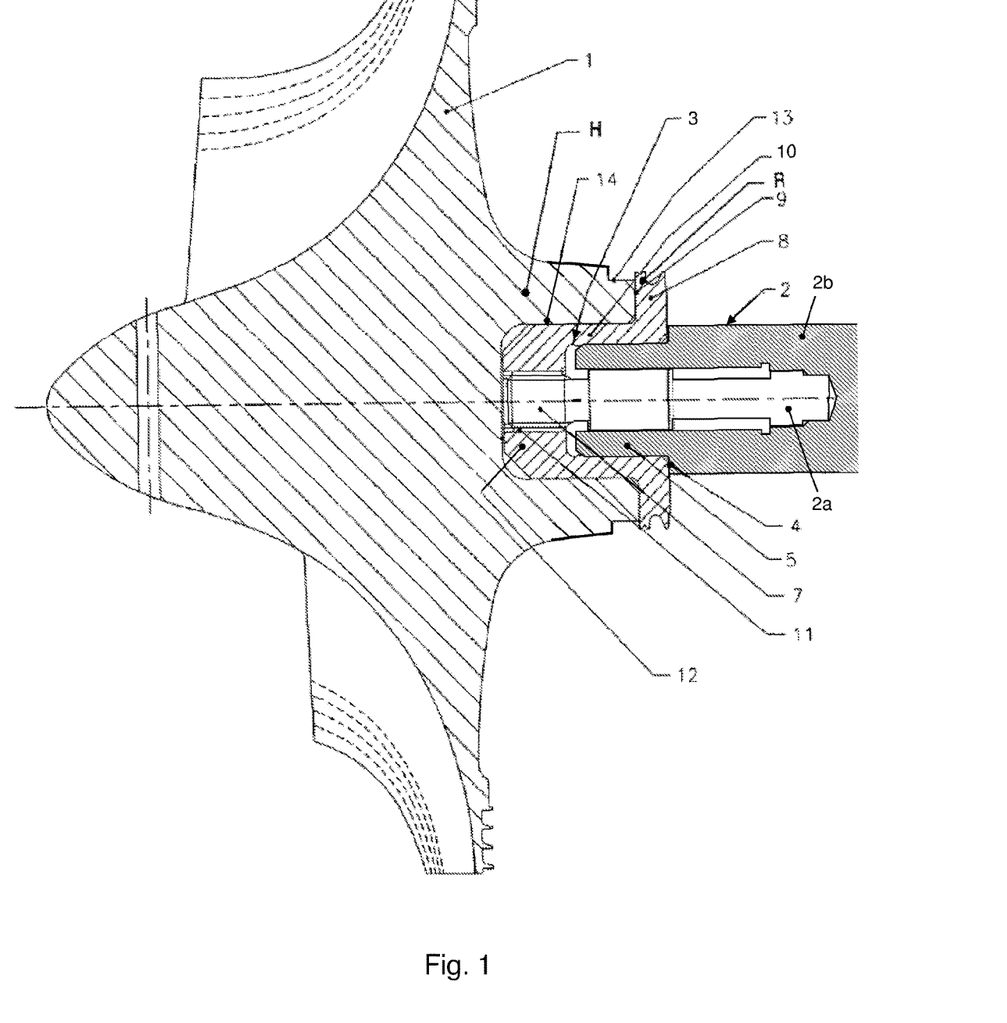
FIG. 1 is a sectional elevation through a turbocharger impeller joined to a shaft in accordance with an embodiment of the invention.

Referring first to FIG. 1, an aluminium alloy impeller 1 is fitted on to a two-part steel turbocharger shaft 2 by means of a connector 3. The alloy of which the impeller is made (known in the U.S.A. by the designation "2618A") has a relatively high strength for use up to a temperature of about 200° C., having a composition of aluminium with about 2.5 wt. % copper and smaller amounts of magnesium, iron and nickel.

The alloy of the impeller 1 has a coefficient of thermal expansion of about $22.7\times10^{-6}$/K, and the steel of the shaft 2 has a coefficient of thermal expansion of about $11\times10^{-6}$/K. The material of the connector 3 preferably has a coefficient of thermal expansion such that the value of $(\alpha_c-\alpha_s)/(\alpha_i-\alpha_s)$ is greater than 0.2, and more preferably greater than 0.3 or 0.4. For example, the connector 3 may be made of magnesium alloy (coefficient of thermal expansion of about $26\times10^{-6}$/K), bronze (coefficient of thermal expansion typically of about $18\times10^{-6}$/K, although as high as $20$-$21\times10^{-6}$/K for manganese-bronze), brass (coefficient of thermal expansion of about $18.7\times10^{-6}$/K) or stainless steel (coefficient of thermal expansion of in the range of $16$-$17.3\times10^{-6}$/K). Such alloys can also be resistant to galling with the steel of the shaft 2.

The connector 3 is of cup-like shape and has an outer surface 14 for connecting to the impeller 1, a threaded portion 12 with a threaded bore 11 forming the base of the cup, and a flange portion 8 around the mouth of the cup.

The shaft 2 is formed at its impeller end with a first shoulder 4 surrounding a cylindrical centring portion 5, and a screw-threaded portion 7 of further reduced diameter extending from the end of the centring portion. The connector 3 is inserted into a blind central recess formed in the hub extension H, with the outer surface 14 of the connector 3 frictionally connected to the radially inner surface of the hub extension H. The flange portion 8 of the connector 3 engages against a shaft-side end face 9 of the hub extension H to determine the relative axial positions of the connector 3 and the hub extension H. The flange portion 8 is engaged on its other side by the shoulder 4 on the shaft 2. The centring portion 5 of the shaft is received in a corresponding centring portion 10 of the connector in a close, but not tight, fit. The threaded bore 11 engages on the screw-threaded portion 7 of the shaft. The threaded portion 12 has a small clearance from the end of the recess.

The connector 3 is fitted on to the hub extension H by cooling the connector 3 to cause it to shrink and by heating the impeller to cause the hub extension H to expand, and then inserting the connector 3 into the central recess of the hub extension H until the flange portion 8 contacts the end face 9 of the hub extension H. On returning from their thermal excursions, the connector 3 and hub extension H frictionally grip across the outer surface 14 of the connector 3 and the radially inner surface of the hub extension H. The outer surface 14 extends within and frictionally contacts most of the axial length of the hub extension H.

The outer diameter of the flange portion 8 is provided with an oil capture/thrower ring R, which in this embodiment of the invention is machined into the flange portion 8. Another option, however, is to form the ring R as a separate component.

After the connector 3 is fitted on to the hub extension H, the screw-threaded portion 7 of the shaft 2 is screwed onto the threaded portion 12 of the connector 3, the respective centring portions 5, 10 ensuring the shaft aligns with the axis of the impeller. The threads are screwed until opposing surfaces of the flange portion 8 and shoulder 4 come into abutment, which causes the threads to tighten and provides a rotationally fixed connection between the impeller 1 and the shaft 2.

Advantageously, by forming the connector 3 from a material having an intermediate coefficient of thermal expansion, the differential thermal forces acting across the frictional connection between the connector 3 and the impeller 1 can be reduced relative to a connector formed from the a material having the same coefficient of thermal expansion as that of the shaft. In this way, the tendency for the impeller to "walk" can also be reduced, which allows the impeller to be driven by a higher torque and therefore increases the maximum pressure ratio of the impeller. In addition, by containing the threaded connection between the connector 3 and the shaft 2 in the central recess of the hub extension H, an axially compact arrangement is achieved. The frictional connection between the connector 3 and the impeller transmits, in use, substantially all of the torque between the shaft 2 and the impeller 1. Further, as there is no need to fit a constraining ring of the type described in EP1394387 to the hub extension H, regrinding operations can be avoided during fitting of the connector 3.

If there is any tendency for the impeller 1 to "walk", advantageously this can be monitored by measuring the size of the gap that would open up between the flange portion 8 and the end face 9. For this reason, it is preferred that the flange portion 8 and the end face 9 determine the relative axial positions of the connector 3 and the hub extension H. Alternative pairs of facing features that could be configured to abut each and thereby determine the relative axial positions (such as the threaded portion 12 and the end of the recess) are less amenable to inspection.

However, the use of a connector with a coefficient of thermal expansion greater than that of the shaft can result in increased tensile stresses in the threads where the threaded portion 7 of the shaft is screwed onto the threaded portion 12 of the connector. To reduce the stresses in the threads, the shaft is formed in two parts, as better shown in FIG. 2, which is a close-up view of the joint between the impeller 1 and the shaft 2 of FIG. 1. The two parts of the shaft are formed of steel, and have identical or similar coefficients of thermal expansion.

Figure 2:
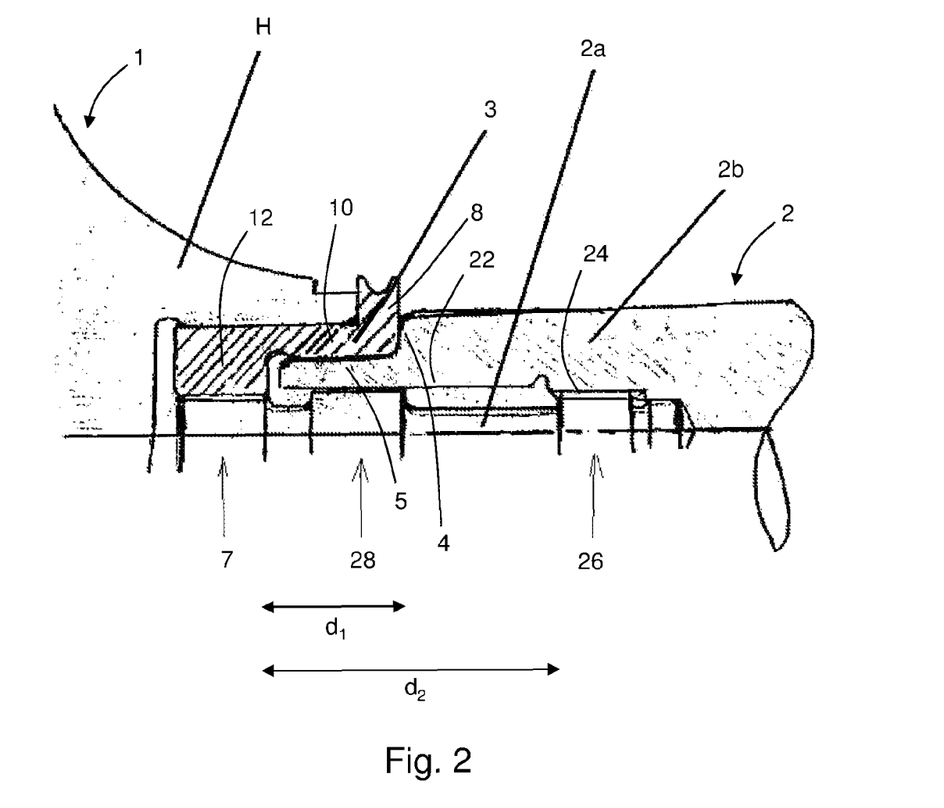
FIG. 2 is a close-up view of the joint between the impeller and the shaft of FIG. 1.

A blind central cavity 22 is formed in an outer part 2*b* of the shaft, with a thread 24 at the bottom of the cavity. An inner part 2*a* of the shaft, in the form of an elongate stud, is located in the cavity, with one end of the stud projecting therefrom. The inner part has, at its projecting end, the threaded portion 7 which screws onto the threaded portion 12 of the connector. The inner part also has a further threaded portion 26 at its opposite end which screws onto the thread 24 at the bottom of the cavity to join the two parts of the shaft in a rotationally fixed relationship. The inner part further has a centring portion 28 at or near the mouth of the cavity which centres the stud in the cavity. The stud may have an additional or alternative centring portion at the blind end of the cavity.

The outer part 2*b* of the shaft has the centring portion 5 which engages with the centring portion 10 of the connector to ensure that the shaft aligns with the axis of the impeller. The outer part also has the shoulder 4, which comes into abutment with the flange portion 8 of the connector, causing the threads to tighten and to provide the rotationally fixed connection between the impeller 1 and the shaft 2

By this two-part arrangement, the axial distance $d_1$ from the threaded portion 7 to the shoulder 4 is less than the axial distance $d_2$ from the threaded portion 7 to the joint between the two parts of the shaft at the further threaded portion 26 and threads 24. Any differential thermal strain set up between the connector 3 and the shaft 2 can thus be accommodated over a longer distance $d_2$ of the shaft than would otherwise be the case. In this way, the tensile stresses in the threads of the threaded portions 7, 12 can be reduced.

Figure 3:
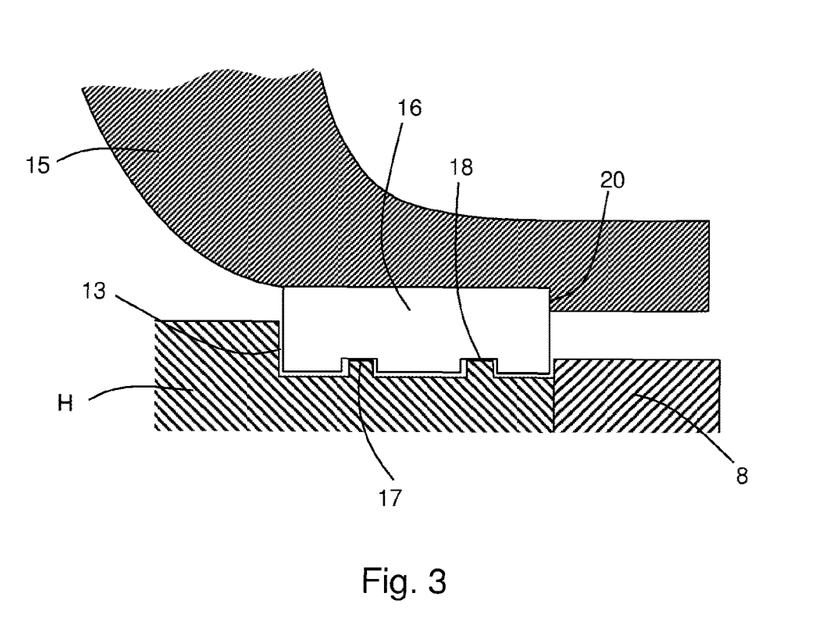
FIG. 3 is a close-up schematic view of a seal between a section of a casing of the impeller of FIG. 1 and a hub extension of the impeller.

As shown better in FIG. 3, a section 15 of the impeller casing and the outer surface of the hub extension H are in close proximity to help provide a rotating oil and pressure seal between the impeller 1 and the casing. To improve the seal, the hub extension H has a recess 13 on its outer surface which is bounded at one end by the flange portion 8 of the first component of the connector and which receives a sealing ring 16 carried by the casing section 15. To reduce wear between the sealing ring 16 and the hub extension H, the casing section 15 has a small abutment surface 20 on the shaft side (right hand side in FIG. 1) of the seal ring 16 and against which the sealing ring 16 rests. To provide enhanced sealing, the sealing ring 16 has annular grooves 18 on its radially inner face, and the recess has corresponding circumferential ribs 17 which are received in the grooves, as described in EP A 1130220. Alternatively, however, the sealing ring can be a plain ring (i.e. without grooves) received in a plain recess (i.e. without ribs). The sealing ring 16 co-operates with the casing section 15 and serves to retain lubricating oil to the shaft side of the assembly and compressed air to the impeller side of the assembly (left hand in FIG. 1). The compressed air is contained between the body of the impeller 1, the hub extension H with its sealing ring 16, and the impeller casing, within which the impeller assembly is mounted for rotation on overhung bearings (not shown).

Figure 4:
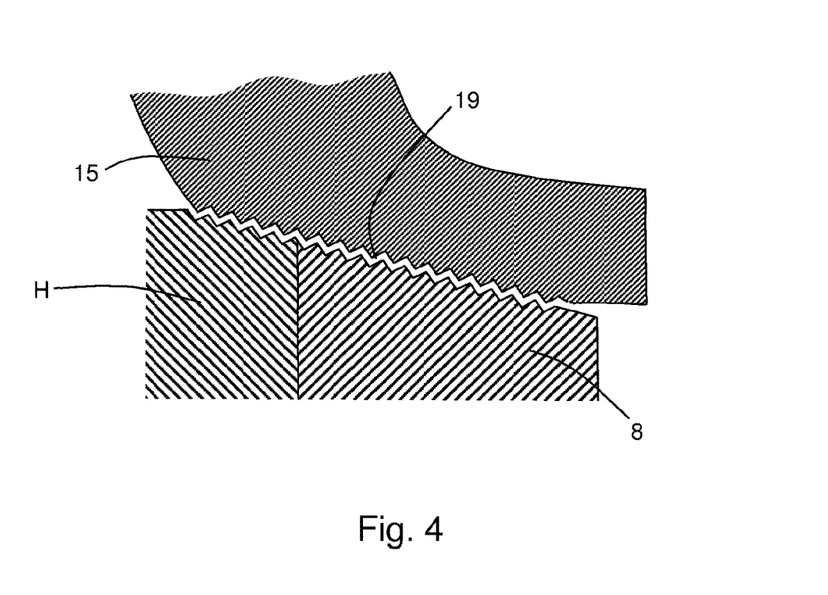
FIG. 4 is a close-up schematic view of a seal between a section of a casing of an impeller and a flange portion of a connector.

FIG. 4 is a close-up schematic view of a seal between a section of a casing of an impeller and the flange portion 8 of a further type of connector 3. In this case, instead of a seal formed by a sealing ring, the hub extension H and flange portion 8 on one side and the casing section 15 on the other side have engaging surfaces 19 carrying respective sets of machined grooves which interlock to form a labyrinth seal.

Figure 5:
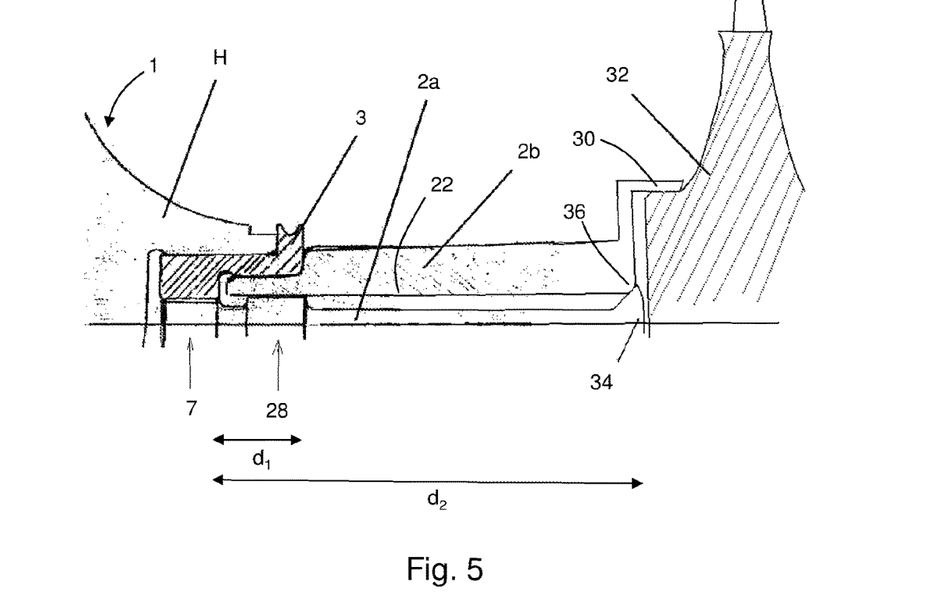
FIG. 5 shows schematically a sectional elevation of a joint between the impeller and a shaft according to a further embodiment of the invention.

FIG. 5 shows schematically a sectional elevation of an impeller and connector of the type shown in FIGS. 1 and 2 connected to a shaft according to a further embodiment of the invention in which the axial distance d2 is increased relative to the axial distance d1. In this embodiment, the inner part 2*a* of the shaft is lengthened so that it takes the form of a tie-bar and protrudes from both ends of the outer part 2*b* of the shaft. Thus the cavity 22 in this case is a through hole rather than a blind hole. Also shown is a shrink-fit connection 30 between the outer part of the shaft distal from the impeller 1 and the turbocharger exhaust gas turbine 32.

In this embodiment, a widened end portion 34 of the tie-bar 2*a* rests against a lip 36 of the turbine-end mouth of the cavity 22, and is tensioned within the outer part 2*b* of the shaft by screwing the impeller assembly onto the threaded portion 7. If frictional contact between the lip of the cavity and the widened end portion is insufficient to prevent rotation of the tie-bar relative to the outer part, these features may have suitable interlocking formations, such as splines or keys, to prevent rotation. Another option is for the turbine end of the tie-bar to be threadingly connected to the outer part of the shaft. Yet another option is for the joint between the two parts of the shaft to be mediated by the turbine 32. For example, the tie-bar may extend further to project through a central hole formed in the turbine, and can then be connected to the turbine (e.g. by a nut which screws onto a threaded end of the tie-bar projecting from the turbine and which locks against the side of the turbine).

Figure 6:
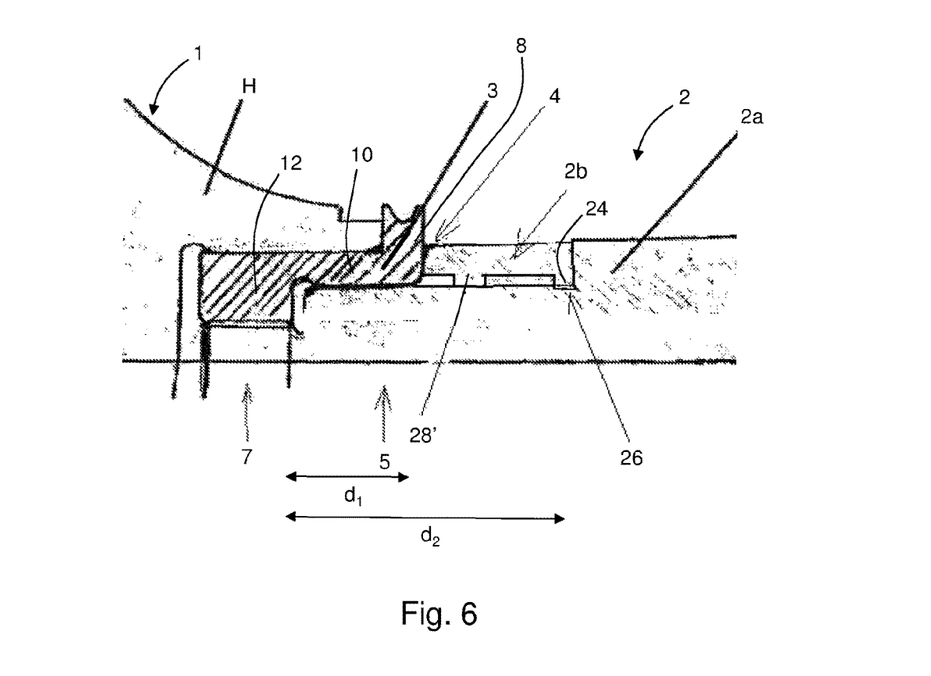
FIG. 6 shows schematically a sectional elevation of a joint between the impeller and a shaft according to another embodiment of the invention.

FIG. 6 shows schematically a sectional elevation of an impeller and connector of the type shown in FIGS. 1 and 2 connected to a shaft 2 according to another embodiment of the invention. In this embodiment, the inner part 2*a* of the shaft is the main part of the shaft and extends from the impeller 1 to the exhaust gas turbine (not shown), while the outer part 2b is a sleeve carried on the inner part. The threaded portion 7 of the inner part is still at an end of the inner part which projects from the outer part. However, the centring portion 5 of the shaft which engages the corresponding centring portion 10 of the connector 3 is now on the inner part 2a. The outer part has a centring portion 28' at or near its impeller end which centres the outer part on the inner part The impeller end of the outer part 2b forms the shoulder 4 which abuts the flange 8 of the connector. The opposite end of the outer part has thread 24 which screws onto the further threaded portion 26 of the inner part 2a to form the joint which rotationally fixes the two parts relative to each other. In this way, the ratio of the axial distance d2 to the axial distance d1 can be similar to that of the embodiment of FIGS. 1 and 2.

Figure 7:
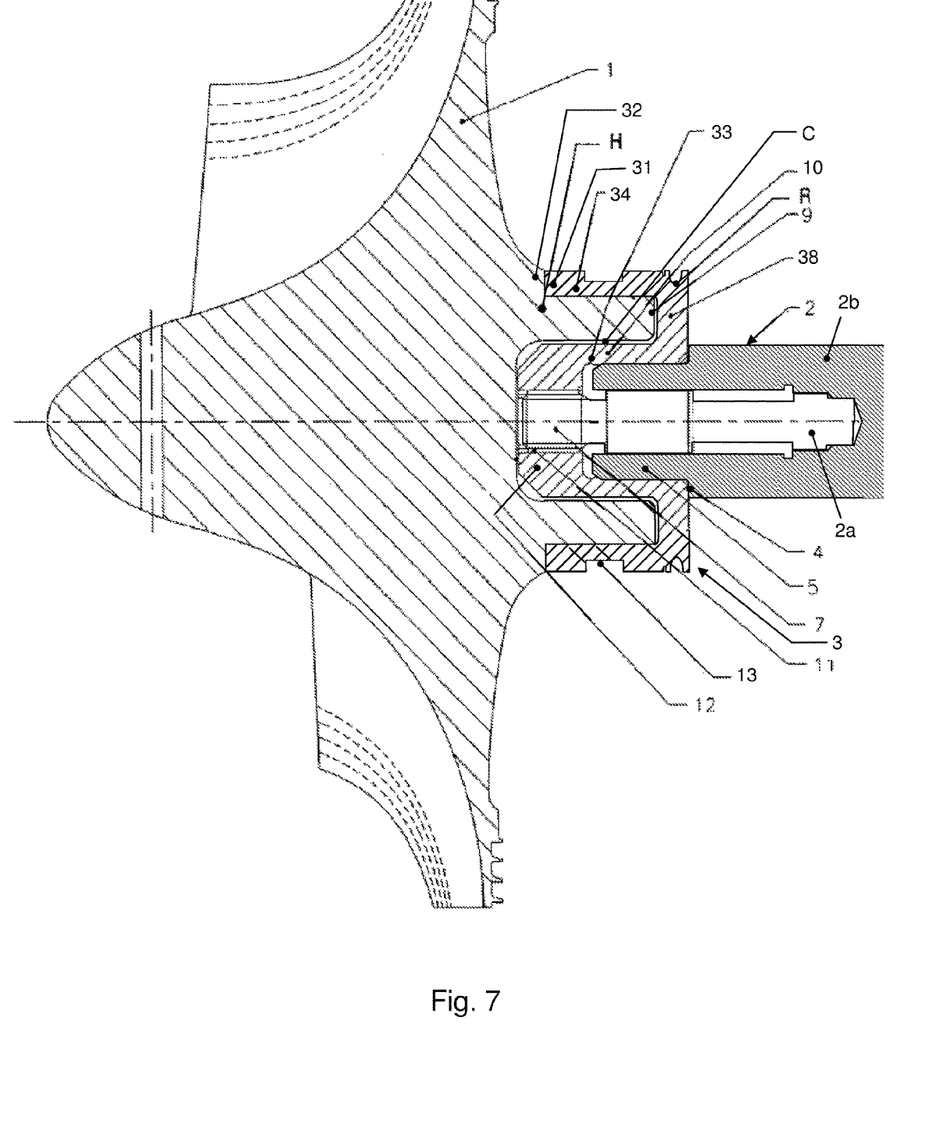
FIG. 7 is a sectional elevation through another turbocharger impeller joined to a shaft in accordance with an embodiment of the invention.

In the above embodiments, an outwardly facing surface of the connector 3 is frictionally connected with a radially inner surface of the hub extension H. However, another option is to make a frictional connection between an inwardly facing surface of the connector and the radially outer surface of the hub extension. The features of the two part shaft 2, however, and its manner of joining to the impeller arrangement can be the same as described in relation to the above embodiments. FIG. 7 which shows a sectional elevation through another turbocharger impeller joined to a two part shaft in accordance with an embodiment of the invention. The shaft 2 is identical to that shown in FIGS. 1 and 2. However, the connector 3 now has an insertion part 33 of cup-like shape which is inserted into the central recess formed in the hub extension H, and a cylindrical sleeve portion 34 around the hub extension H. An abutment portion 31 at the impeller side end of the sleeve portion 14 engages against an impeller-side end face 32 of the hub extension H to determine the relative axial positions of the sleeve portion 14 and the hub extension H. A lip portion 38 around the mouth of the insertion part 33 joins the sleeve portion 14 and the insertion part 33. The lip portion 38 has a small clearance from the shaft-side end face 9 of the hub extension H, but is engaged on its other side by the shoulder 4 on the shaft 2. The centring portion 5 of the shaft is received in a corresponding centring portion 10 of the insertion part 33 in a close, but not tight, fit. The end of the insertion part 33 forms a threaded portion 12 having a threaded bore 11 which engages on the screw-threaded portion 7 of the shaft. The threaded portion 12 has a small clearance from the end of the recess.

The sleeve portion 34 is fitted on to the hub extension H by heating the connector 3 to cause sleeve portion 34 to expand, and then slipping sleeve portion 34 on to the cylindrical outer surface of the hub extension H where, on cooling, it frictionally grips. The sleeve portion 34 extends over and thereby frictionally contacts most of the axial length of the hub extension H, although in other variants the sleeve portion 34 can extend over only a portion of the axial length, and/or frictional contact can extend between the sleeve portion 34 and the hub extension H over only a portion of the overlap region between the sleeve portion 34 and the hub extension H. The connector has a lower coefficient of thermal expansion than the aluminium alloy of the impeller and hence the sleeve portion 14 does not expand as much with rising temperature as the hub extension H. This difference in their respective coefficients of expansion ensures that during operation, as the impeller assembly heats up, the joint between the hub extension and the sleeve tightens, reducing any tendency for relative movement between impeller and connector under the influence of centrifugal and thermal stresses, and increasing the torque capacity of the joint.

The impeller assembly is built up as follows. The connector 3 is warmed, and the sleeve portion 34 is slid on to the cylindrical outer surface of the hub extension H until the abutment portion 31 contacts the end face 32 of the hub extension H. The insertion part 33 of the connector inserts into the central recess of the hub extension H. When the connector cools, a frictional connection is thus formed between the sleeve portion 34 and the hub extension H. However, the connector is sized such that a clearance C prevents the insertion part 33 from contacting the side of the central recess. The screw-threaded portion 7 of the shaft 2 is then screwed onto the threaded portion 12 of the connector, the respective centring portions 5, 10 ensuring the shaft aligns with the axis of the impeller. The threads are screwed until opposing surfaces of the lip portion 38 and shoulder 4 come into abutment, which causes the threads to tighten and provides a rotationally fixed connection between the impeller 1 and the shaft 2.

While the invention has been described in conjunction with the exemplary embodiments described above, many equivalent modifications and variations will be apparent to those skilled in the art when given this disclosure. For example, the threads carried by the threaded portion of the connector may be protected by a helicoil formation to prevent damage to the threads of the connector from the stronger material of the shaft. Accordingly, the exemplary embodiments of the invention set forth above are considered to be illustrative and not limiting. Various changes to the described embodiments may be made without departing from the spirit and scope of the invention.

All references referred to above are hereby incorporated by reference.

The invention claimed is:
1. An assembly comprising:
an impeller; and
a shaft connected to said impeller, wherein said shaft has a first part which has a threaded portion carrying a thread which screws onto a corresponding threaded portion of a connector of said impeller and a second part which provides a shoulder forming an abutment surface engaging a corresponding abutment surface of the connector of said impeller when the threaded portions are screwed together so as to tighten the threads to provide a rotationally fixed connection between the impeller and said shaft, wherein the first part is rotationally fixed relative to said second part at a joint between said first part and said second part, the threaded portion of said shaft being axially spaced a first distance from the abutment surface of the shaft, the threaded portion of the shaft being axially spaced from the joint by a second distance which is greater than the first distance, the threaded portion of the shaft and the joint being on a same side of said impeller, wherein the connector is rotationally fixed relative to a remainder of said impeller, wherein said impeller has a shaft-side hub extension having a central recess, an inwardly facing surface of the connector frictionally connects with a radially outer surface of the shaft side hub extension, the frictional connection between the inwardly facing surface of the connector and the radially outer surface of the shaft-side hub extension transmitting, in use, substantially all of a torque between said shaft and said impeller, wherein the connector is inserted into the central recess, and wherein the corresponding threaded portion of the connector is within the central recess.

2. The assembly of claim 1, wherein the first part of said shaft is an elongate member which is located in and projects from a central cavity formed in the second part of said shaft, the threaded portion of the shaft being provided at a projecting end of the elongate member, the joint being at an opposite end of the elongate member.

3. The assembly of claim 1, wherein the second part of said shaft is a sleeve carried on the first part of said shaft, the abutment surface of said shaft being at an end of the sleeve proximal to the threaded portion of said shaft and the joint being at an end of the sleeve distal from the threaded portion of said shaft.

4. A turbocharger having the assembly of claim 1.

* * * * *